United States Patent
McCracken et al.

(10) Patent No.: US 10,736,267 B2
(45) Date of Patent: Aug. 11, 2020

(54) AUTOMATED HEMP FIELD HARVESTER

(71) Applicant: RHHE, LLC, Mt Crested Butte, CO (US)

(72) Inventors: Toby R. McCracken, Olathe, CO (US); Michael D. Meyer, Montrose, CO (US); John Robert Isom, Delta, CO (US)

(73) Assignee: RHHE, LLC, Mt. Crested Butte, CO (US)

( * ) Notice: Subject to any disclaimer, the term of this patent is extended or adjusted under 35 U.S.C. 154(b) by 0 days.

(21) Appl. No.: 16/680,691

(22) Filed: Nov. 12, 2019

(65) Prior Publication Data

US 2020/0214207 A1 Jul. 9, 2020

Related U.S. Application Data

(60) Provisional application No. 62/789,448, filed on Jan. 7, 2019.

(51) Int. Cl.
*A01D 45/06* (2006.01)
*A01D 41/14* (2006.01)
(Continued)

(52) U.S. Cl.
CPC ........... *A01D 45/065* (2013.01); *A01D 41/06* (2013.01); *A01D 41/142* (2013.01); *A01D 43/086* (2013.01); *A01D 61/02* (2013.01)

(58) Field of Classification Search
CPC ...... A01D 37/02; A01D 61/008; A01D 61/02; A01D 57/12; A01D 47/00; A01D 46/04;
(Continued)

(56) References Cited

U.S. PATENT DOCUMENTS 1,763,646 A * 6/1930 Callahan ................ A01D 46/12
56/49
2,855,058 A * 10/1958 Krier ...................... A01D 45/28
171/42
(Continued)

FOREIGN PATENT DOCUMENTS

EP 2556740 A1 2/2013
GB 641731 A 8/1950
(Continued)

*Primary Examiner* — Robert E Pezzuto
*Assistant Examiner* — Adam J Behrens
(74) *Attorney, Agent, or Firm* — Stanley J. Gradisar Attorney At Law, LLC; Stanley J. Gradisar

(57) ABSTRACT

An automated hemp field harvester can be driven by a tractor or attached to various types of self-propelled machines. The automated hemp field harvester has a set of two combing belts that rotate up vertically with a plurality of comb assemblies for stripping the buds and flowers from the hemp plant as the automated hemp field harvester is directed down the row of hemp plants. A set of winged plates in front of the combing belts gather the hemp plants and directs them into the drive assemblies. The comb assemblies are inclined in an upward direction and strip the buds and flowers from the stalks and stems. There is a deflecting plate at the top end of the combing belts to deflect the buds and flowers in a controlled manner to a product discharge conveyor belt to be loaded into a trailer or wagon for removal from the field.

21 Claims, 8 Drawing Sheets

(51) Int. Cl.
*A01D 61/02* (2006.01)
*A01D 41/06* (2006.01)
*A01D 43/08* (2006.01)

(58) Field of Classification Search
CPC ........ A01D 46/06; A01D 46/12; A01D 46/16;
A01D 46/00; A01D 17/10; A01D 23/06;
A01D 25/048; A01D 2023/022; A01D
2023/028; A01D 29/00; A01D 33/02;
A01D 43/086; A01D 43/083; A01D
45/00; A01D 45/065; A01D 45/22; A01D
45/24; A01D 45/26; A01D 45/263; A01D
45/266; A01D 45/28; A01D 45/30; A01D
45/003; A01D 45/04; A01D 45/06; A01D
45/16; A01D 41/06; A01D 41/142; A01D
41/08; A01D 41/10; Y10S 56/01; Y10S
56/12; Y10S 56/19; Y10S 56/21
See application file for complete search history.

(56) References Cited

U.S. PATENT DOCUMENTS

| | | | |
|---|---|---|---|
| 3,589,117 A | 6/1971 | Wadsworth | |
| 3,822,534 A | 7/1974 | Martin | |
| 3,825,138 A * | 7/1974 | Pool | A01D 41/1217 414/505 |
| 3,988,877 A | 11/1976 | Martin et al. | |
| 3,992,860 A * | 11/1976 | Bobbitt, Jr. | A01D 45/16 56/27.5 |
| 4,171,607 A | 10/1979 | Taylor et al. | |
| 4,212,146 A | 7/1980 | Eistert | |
| 4,276,738 A * | 7/1981 | Ferraro | A01D 46/02 56/130 |
| 4,581,880 A * | 4/1986 | Klinner | A01D 43/10 56/364 |
| 4,790,128 A * | 12/1988 | Klinner | A01D 41/06 56/364 |
| 4,951,451 A * | 8/1990 | Klinner | A01D 41/06 460/140 |
| 4,951,453 A * | 8/1990 | Klinner | A01D 41/06 56/16.4 R |
| 5,036,653 A * | 8/1991 | Klinner | A01D 41/06 460/121 |
| 5,111,645 A * | 5/1992 | Klinner | A01D 41/06 56/364 |
| 5,185,991 A * | 2/1993 | Klinner | A01D 41/06 56/128 |
| 5,193,331 A * | 3/1993 | Quandt | A01D 45/22 56/12.8 |
| 5,428,946 A * | 7/1995 | Hansen | A01D 45/16 56/14.3 |
| 5,974,772 A * | 11/1999 | Chuksin | A01D 41/06 56/128 |
| 6,779,329 B2 * | 8/2004 | Yoder | A01D 45/00 56/330 |
| 7,721,516 B2 | 5/2010 | Wendling | |
| 8,428,829 B2 | 4/2013 | Brunnert et al. | |
| 9,107,342 B2 | 8/2015 | Abbott et al. | |
| 9,462,748 B2 | 10/2016 | Dollinger et al. | |
| 2009/0019826 A1 * | 1/2009 | Rigney | A01D 43/00 56/13.5 |
| 2014/0075911 A1 * | 3/2014 | Huang | A01D 41/12 56/122 |
| 2014/0165522 A1 | 6/2014 | Braunbeck et al. | |
| 2017/0000028 A1 * | 1/2017 | Bertino | A01D 57/12 |
| 2018/0054973 A1 | 3/2018 | Raichart | |
| 2018/0303033 A1 | 10/2018 | Jones | |

FOREIGN PATENT DOCUMENTS

| | | |
|---|---|---|
| GB | 736092 A | 8/1955 |
| GB | 1458786 A | 12/1976 |

* cited by examiner

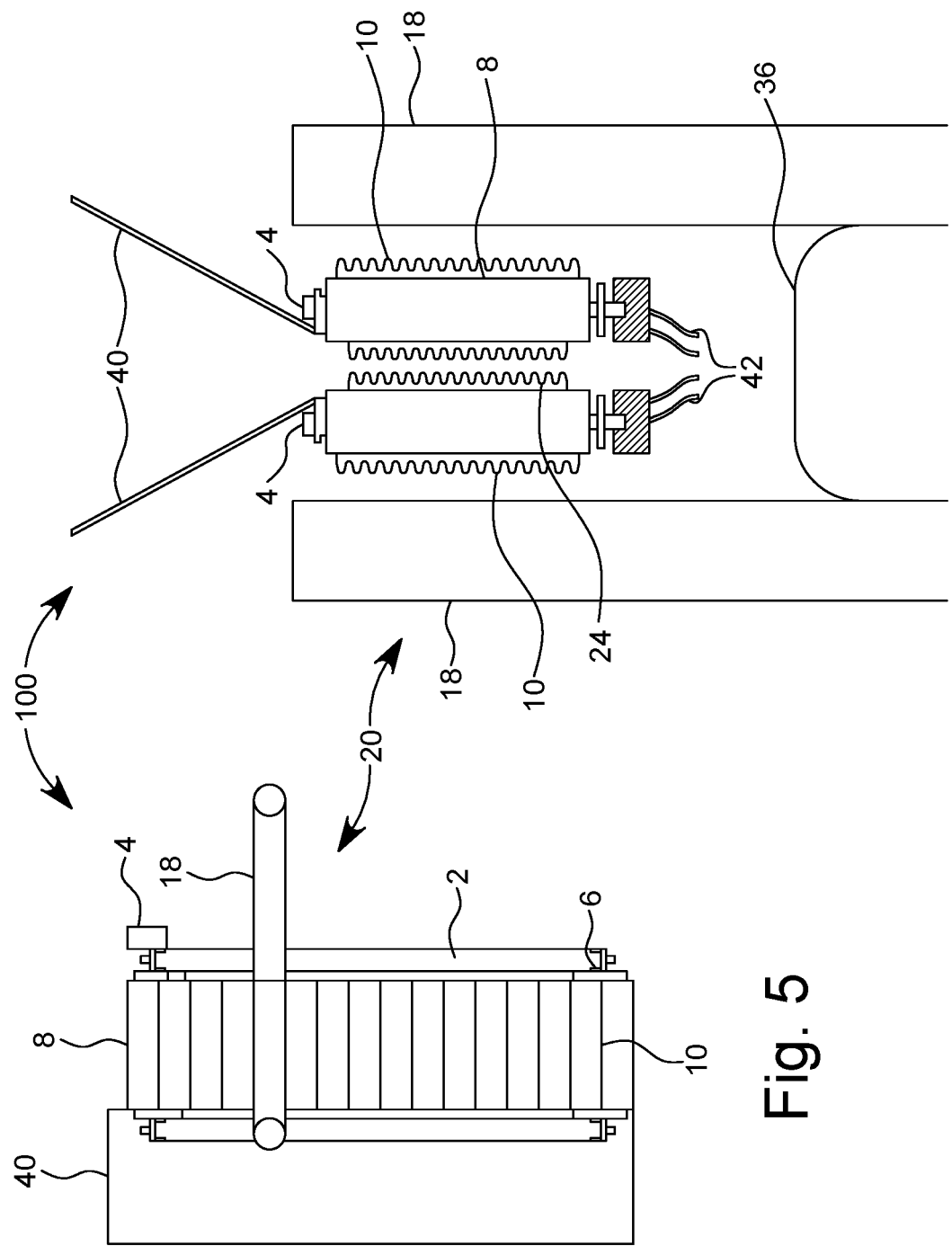

US 10,736,267 B2

AUTOMATED HEMP FIELD HARVESTER

CROSS-REFERENCES TO RELATED APPLICATIONS

This application claims the benefit of U.S. Provisional Application Ser. No. 62/789,448 filed on Jan. 7, 2019 titled "AUTOMATED HEMP FIELD HARVESTER" which is incorporated herein by reference in its entirety for all that is taught and disclosed therein.

BACKGROUND

U.S. hemp production is rapidly increasing. 2018 total hemp licensed acreage was 78,176 acres compared to just 25,713 acres in 2017. Exponential growth in acreage is expected in the years ahead. Cannabidiol (CBD) is an active ingredient in cannabis derived from the hemp plant. CBD product sales in 2018 was $591 million and is projected to grow to $22 billion by 2011 making it the fasted growing industry in the world. The recently passed 2018 Farm Bill removed hemp from the federally controlled substance list and legalized cultivation and interstate transport.

Hemp plants are typically grown in greenhouses and then transplanted outdoor in rows. Weeds are controlled manually to avoid prohibited pesticides and herbicides. Harvesting buds and flowers from hemp plants is typically done manually with hand tools. This is very labor intensive and time consuming. Both of these factors increase production time and increase the cost of bringing various products derived from the buds and flowers to market. Harvesting and post-harvesting is by far the most expensive process in the agricultural process for hemp. What is needed in the art is an automated way to harvest hemp buds and flowers that reduces both time and manpower.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The detailed description below describes an automated hemp field harvester. The solution described below enables an automated method for harvesting buds and flowers from hemp plants.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a entity" or "an entity" refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof, shall include all those described in the summary of the invention, brief description of the drawings, detailed description, abstract, and claims themselves.

Unless the meaning is clearly to the contrary, all ranges set forth herein are deemed to be inclusive of the endpoints.

The automated hemp field harvester is designed and manufactured for the harvesting of the buds and flowers from the stalk and stems of hemp plants, including *SATIVA L* genus plant of all varieties and strains, while still standing in the field. The harvester can be attached to various types of self-propelled machines, such as tractors or other farm utility vehicles. The harvester has a set of two combing belts that rotate up vertically with a plurality of comb assemblies for stripping the buds and flowers from the stalk and stems of the hemp plant as the harvester is directed down the row of hemp plants. There is a set of winged plates in front of the combing belts for gathering the up to five-foot-wide hemp plants and directing them into the combing belts. The comb assemblies are inclined in an upward direction and strip the buds and flowers from the stalks, leaving only the stalk and stems of the hemp plant. There is a deflecting plate at the top of the combing belts to deflect the buds and flowers in a controlled manner to a product discharge conveyor belt to be loaded into a trailer or wagon or truck for removal from the field. There can be several vertical assemblies mounted to the self-propelled machinery to harvest two or more rows at a time as opposed to just one row at a time. The harvester is designed to be a one-step mechanical process eliminating the need for massive amounts of hand labor in the field to harvest the hemp crop.

BRIEF DESCRIPTION OF THE SEVERAL VIEWS OF THE DRAWINGS

FIG. 5 shows a partial view of the gathering wings and the drive assembly in an embodiment of the automated hemp field harvester.

FIG. 6 shows a partial plan view of the gathering wings and the comb assembly in an embodiment of the automated hemp field harvester.

Figure 1:
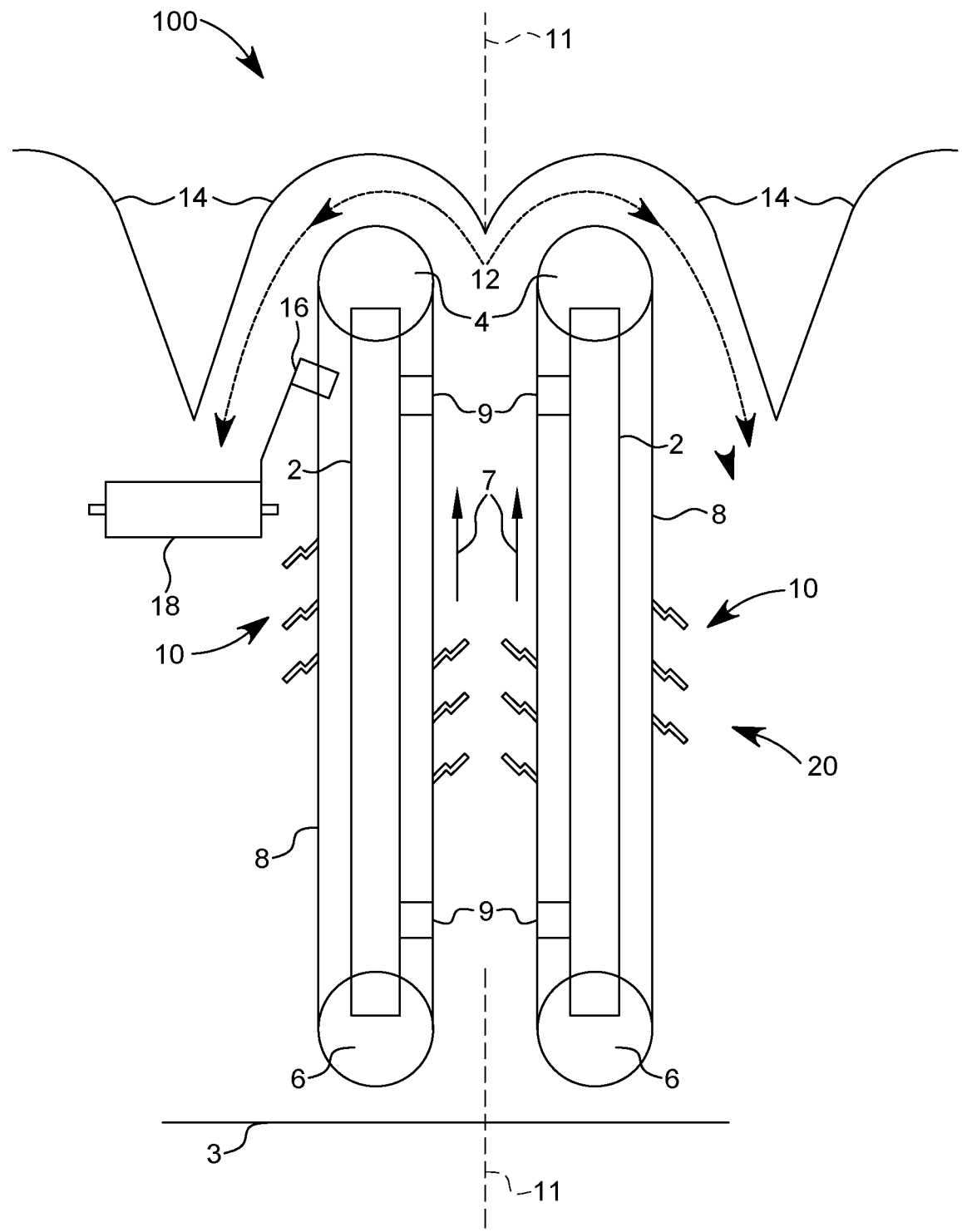
FIG. 1 shows an elevation view looking parallel to the combing belts of an embodiment of the automated hemp field harvester.

To assist in the understanding of the present disclosure the following list of components and associated numbering found in the drawings is provided herein:

| Table of Components | |
| --- | --- |
| Component | # |
| structural frame member | 2 |
| ground | 3 |
| drive drum pulleys | 4 |
| crowned wing pulleys | 6 |
| direction arrows | 7 |
| combing belts | 8 |
| belt stabilizers | 9 |
| comb assemblies | 10 |
| center line | 11 |
| travel arrows | 12 |
| deflecting plates | 14 |
| cleaning brushes | 16 |
| product discharge conveyor belts | 18 |
| drive assemblies | 20 |
| combs | 22 |
| teeth | 24 |
| recesses | 25 |
| mounting belts | 26 |
| first side | 30 |
| second side | 32 |
| acute angle | 34 |
| self-propelled machine | 36 |
| hemp plants | 38 |
| gathering wings | 40 |
| front attachment device | 42 |
| gathering chain | 44 |
| inner chain | 46 |
| outer serpentine belt | 48 |
| drive sprocket | 50 |
| stalk holding attachment | 52 |
| direction arrows | 54 |
| support structures | 56 |
| call out area | 58 |
| stalk | 60 |
| tractor | 62 |
| final product discharge conveyor | 64 |
| rear attachment device | 66 |
| product transports | 68 |
| rows of hemp plants | 72 |
| product conveyor system | 74 |
| automated hemp field harvester | 100 |

DETAILED DESCRIPTION

Figure 2:
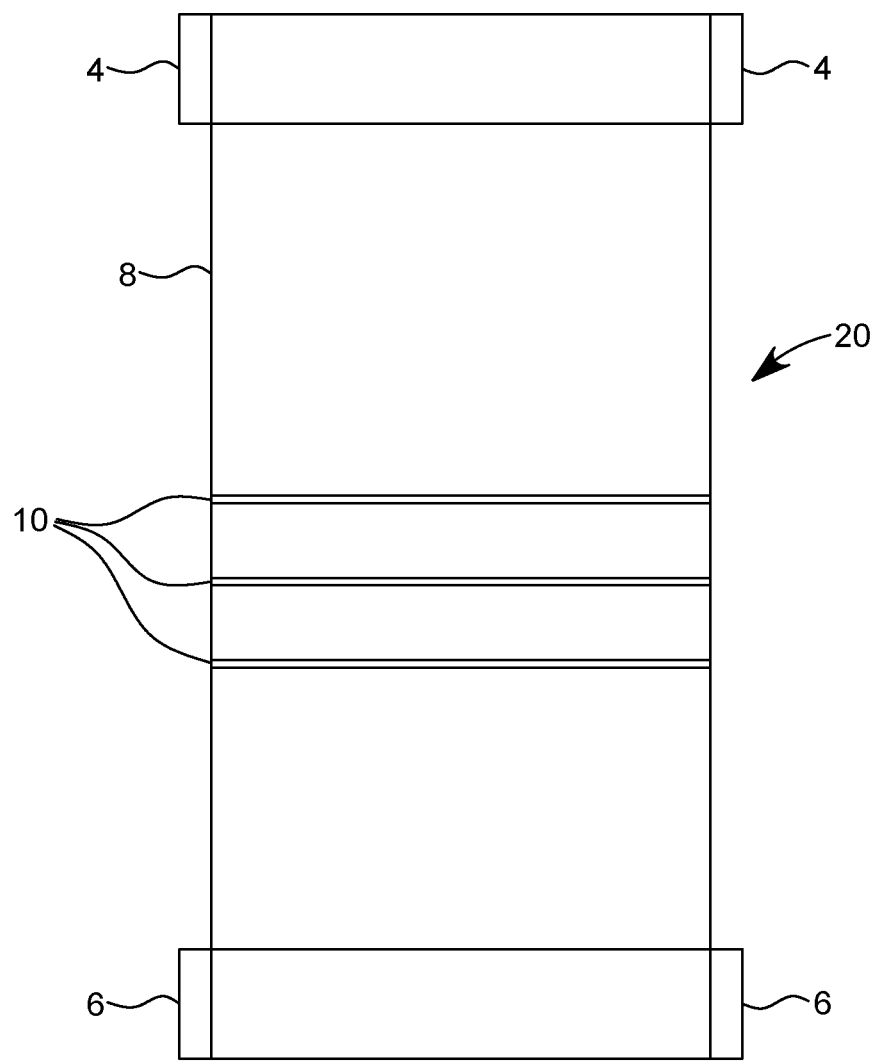
FIG. 2 shows an elevation view looking perpendicular to the combing belts of an embodiment of the automated hemp field harvester.

Referring now to the Figures, in which like reference numerals refer to structurally and/or functionally similar elements thereof, FIG. 1 shows an elevation view of an embodiment of the automated hemp field harvester, and FIG. 2 shows an elevation view looking perpendicular to the combing belts of an embodiment of the automated hemp field harvester. Referring now to FIGS. 1 and 2, automated hemp field harvester 100 has a drive assembly 20 that has structural frame members 2 that provide structural support to the other components. A pair of drive drum pulleys 4 are affixed to the top of structural frame members 2, and a pair of crowned wing pulleys 6 are affixed to the bottom of structural frame members 2. A pair of combing belts 8 are held in tension by drive drum pulleys 4 and crowned wing pulleys 6 and each are driven by drive drum pulleys 4 in the directions indicated by direction arrows 7. The drive drum pulleys 4 are variable in speed, typically between one to two hundred revolutions per minute. The combing belts 8 are stabilized as they move in their rotational path about drive drum pulleys 4 and crowned wing pulleys 6 through several belt stabilizers 9 (more are used than are shown) attached to structural frame members 2. In one embodiment, the combing belts 8 are four feet wide by eight feet tall for a total length of about 18 feet. The idle end of the drive assembly 20 is controlled with the crowned wing pulleys 6 for belt tightening and cleaning. Belt stabilizers 9 keep the combing belts 8 from excessive horizontal movement as they rotate around drive drum pulleys 4 and crowned wing pulleys 6. The drive assembly 20 is propelled down a row of hemp plants with center line 11 aligning with the main stalks of the hemp plants. The drive assembly 20 is oriented in an upward direction with respect to the ground 3.

A plurality of comb assemblies 10 are attached to the combing belt 8 across the width of combing belt 8 and in one embodiment, are spaced six inches apart (more are used than are shown). The comb assemblies 10 are inclined with respect to the combing belt 8. In one embodiment, the incline is approximately 60°. As the comb assemblies 10 attached to the two combing belts 8 move in the vertical direction indicated by directional arrows 7, the buds and flowers are stripped from the stalks and stems of the hemp plants and travel in the direction indicated by travel arrows 12. Deflecting plates 14 at the top of the drive assembly 20 deflect the buds and flowers in a controlled manner onto one or more product discharge conveyor belts 18 (only one is shown in FIG. 1) which convey the buds and flowers into a trailer or wagon (see FIGS. 9 and 10) via a final product discharge conveyor 64 (see FIG. 9) or via a product conveyor system 74 (see FIG. 10) for removal from the field for processing. There can be several drive assemblies 20 mounted to the tractor-driven embodiment (see FIG. 9) or mounted to self-propelled machinery (see FIG. 10) to harvest two or more rows of hemp plants at a time instead of just one row at a time. A typical row width of hemp plants 8 is five feet so there can be several drive assemblies 20 on five-foot centers. Drive assemblies 20 are positioned a few inches above the ground 3. The crowned wing pulleys 6 are father apart from each other than are the drive drum pulleys 4 to accommodate the thicker part of the hemp stalk near the ground 3 with the thinner part of the hemp stalk near the top of the drive assembly 20. As the comb assemblies 10 round the top of the drive assemblies 20 and begin their travel downward, they come in contact with cleaning brush 16 (only one is shown in FIG. 1) which helps deflect the buds and flowers from the comb assemblies 10 and allow the buds and flowers to continue to follow travel arrows 12 onto the product discharge conveyor belts 18. The cleaning brush 16 is as wide as the combing belt 8.

Figure 3A:
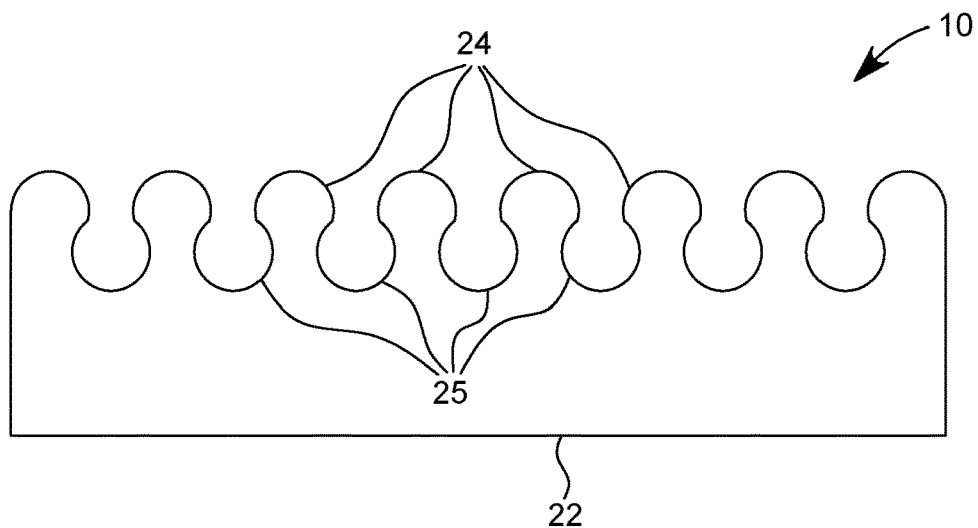
FIGS. 3A and 3B show the components of the comb assembly in an embodiment of the automated hemp field harvester.
Figure 3B:
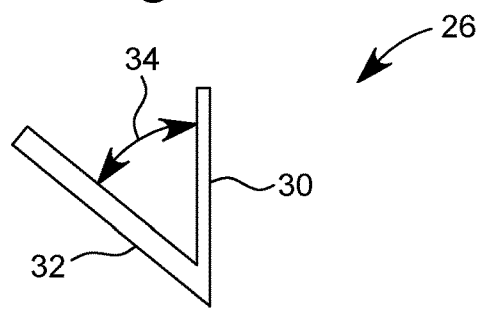

FIGS. 3A and 3B show the components of the comb assembly in an embodiment of the automated hemp field harvester. Referring now to FIGS. 3A and 3B, FIG. 3A shows a plan view of a portion of comb 22 which has a plurality of teeth 24 and a plurality of recesses 25. Comb 22 is as wide as combing belt 8. The stems of the hemp plant are forced into the recesses 25 and the buds and flowers of the hemp plant are stripped by the combination of the recesses 25 and teeth 24.

FIG. 3B shows an end view of the mounting belt 26 which is as wide as the combing belt 8. The mounting belt 26 has a first side 30 that is secured to the combing belt 8 and a second side 32 that is secured to the comb 22 (see FIG. 7). The first side 30 and the second side 32 are oriented at an acute angle 34 to each other. In one embodiment, the acute angle 34 is approximately 60°.

Figure 4:
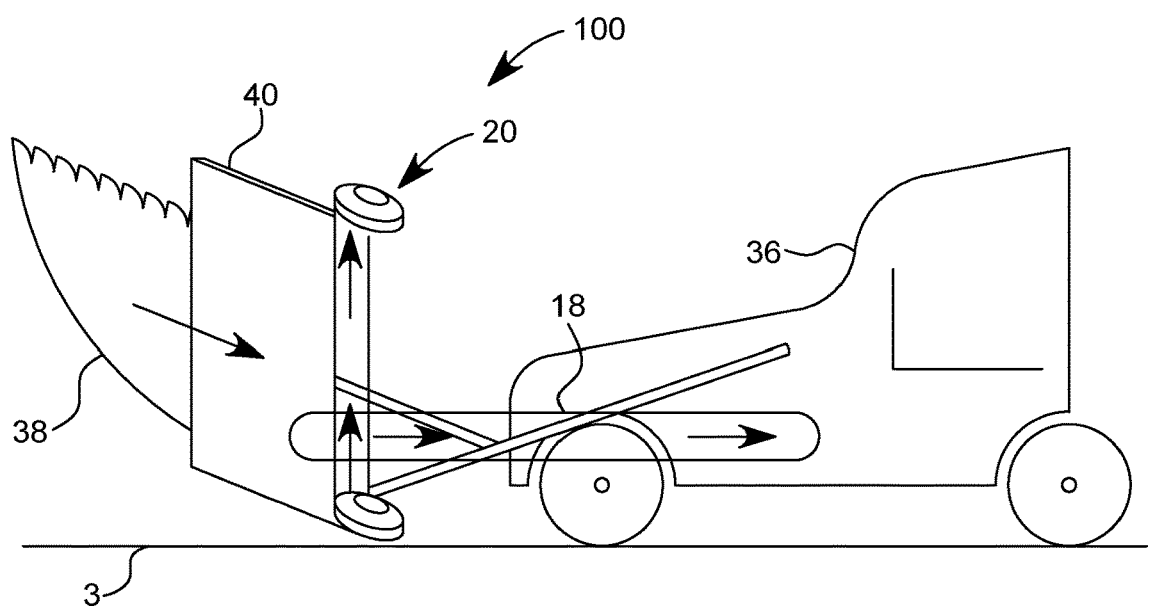
FIG. 4 shows a partial side view of an embodiment of the automated hemp field harvester.

FIG. 4 shows a partial side view of an embodiment of the automated hemp field harvester. Referring now to FIG. 4, drive assembly 20 is secured to a self-propelled machine 36. As self-propelled machine 36 is driven down a row of hemp plants 38, they are funneled by gathering wings 40 into the drive assemblies 20. The buds and flowers stripped from the hemp plants 38 are directed onto product discharge conveyor belts 18 where they are conveyed to a trailer or wagon (see FIGS. 9 and 10) via a final product discharge conveyor 64 (see FIG. 9) or via a product conveyor system 74 (see FIG. 10) for removal from the field for processing. Typical ground speed for self-propelled machine 36 is one to three miles per hour.

FIG. 5 shows a partial view of the gathering wings and the drive assembly in an embodiment of the automated hemp field harvester. FIG. 6 shows a partial plan view of the gathering wings and the drive assembly in an embodiment of the automated hemp field harvester. Referring now to FIGS. 5 and 6, as self-propelled machine 36 propels automated hemp field harvester 100 down the rows of hemp plants 38, gathering wings 40 direct the hemp plants into combing belts 8 driven by drive drum pulleys 4 while comb assemblies 10 strip the buds and flowers which are directed onto product discharge conveyor belts 18. Front attachment device 42, such as a 3-point lift or other suitable mechanism, secures the automated hemp field harvester 100 to the self-propelled machine 36.

Figure 7:
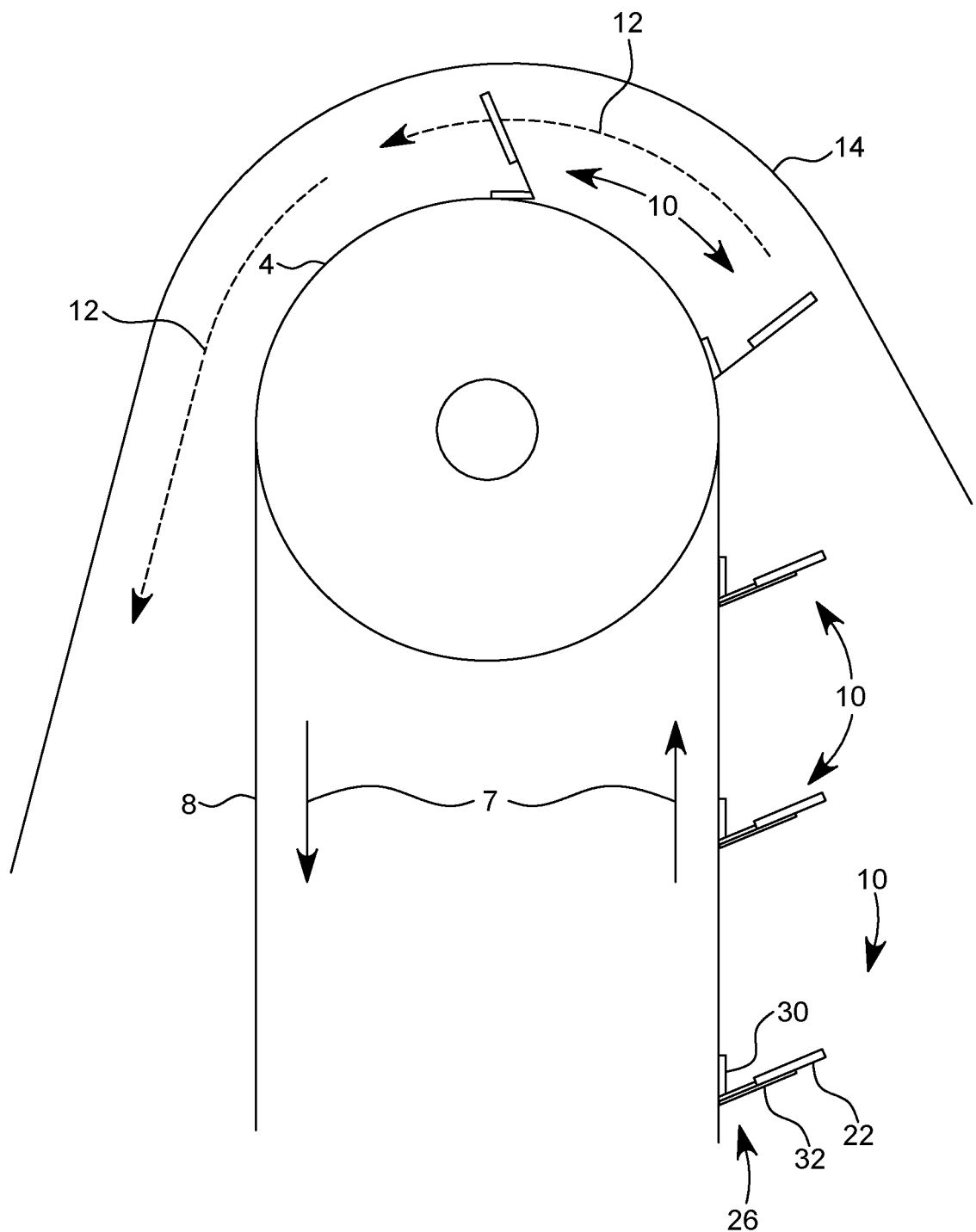
FIG. 7 shows a partial elevation view looking parallel to a combing belt of an embodiment of the automated hemp field harvester.

FIG. 7 shows a partial elevation view looking parallel to a left side combing belt of an embodiment of the automated hemp field harvester. Referring now to FIG. 7, a more detailed view is shown of the upper drive drum pulley 4 as it drives combing belt 8 in the direction shown by direction arrows 7. The plurality of comb assemblies 10 strip the flowers and buds from the hemp plant and deflecting plate 14 directs them along a path indicated by travel arrows 12.

Figure 8B:
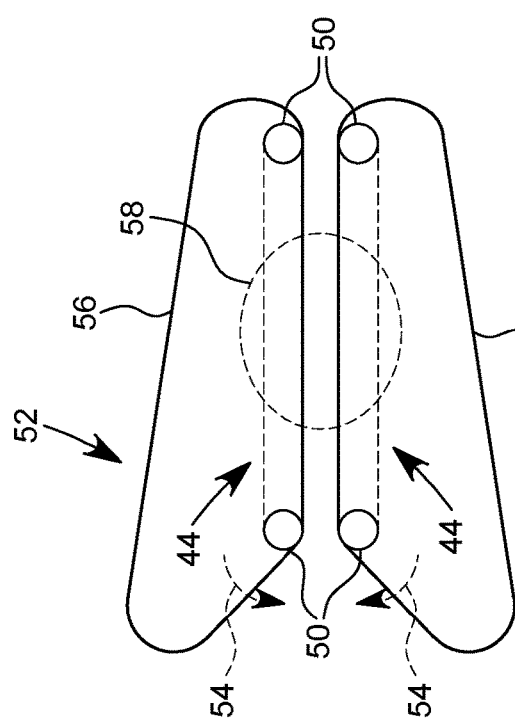
FIGS. 8A, 8B, and 8C show various views of a stalk holding attachment that optionally may be used in an embodiment of the automated hemp field harvester.
Figure 8A:
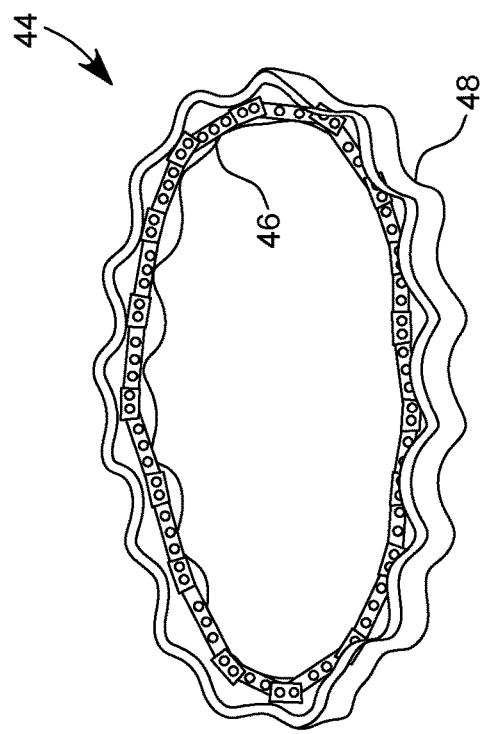
Figure 8C:
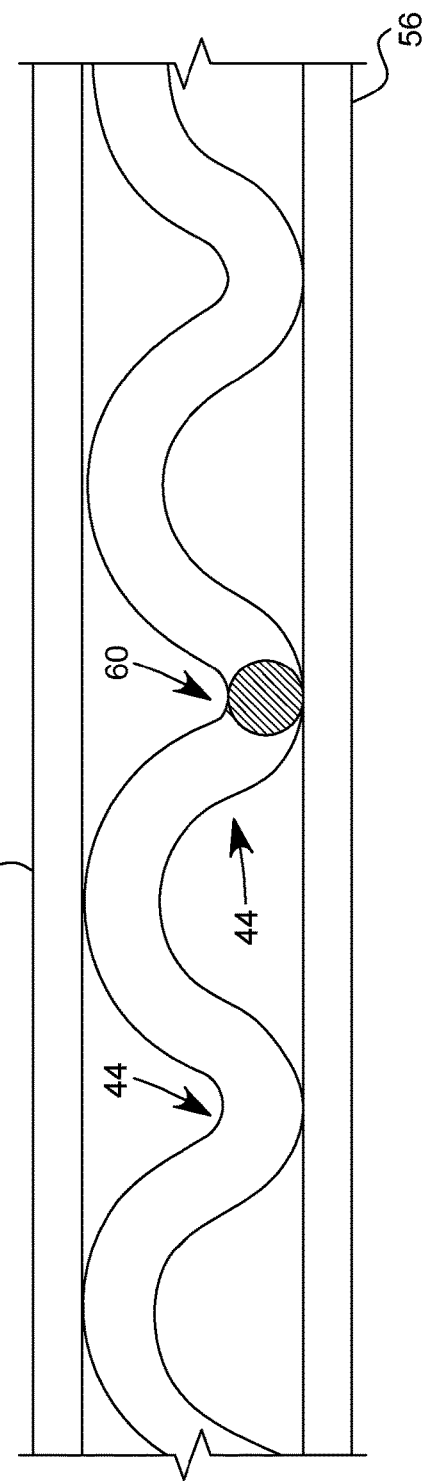

FIGS. 8A, 8B, and 8C show various views of a stalk holding attachment that optionally may be used in an embodiment of the automated hemp field harvester. Some varieties of hemp plants 38 do not have a very robust root structure such that there is a risk of the drive assemblies 20 uprooting the hemp plants 38 during harvesting. Also, if the ground 3 has a high enough moisture content, even hemp plants with sturdy root structures may be uprooted by drive assemblies 20 during harvesting. For either condition, an optional stalk holding attachment 52 may be secured under the drive assemblies 20. Referring now to FIG. 8A, a gathering chain 44 is comprised of an inner chain 46 and an outer serpentine belt 48.

Referring now to FIG. 8B shown in plan view, two gathering chains 44 are each tensioned and driven by a pair of drive sprockets 50 which are secured at a front end and a back end to the support structures 56. The two gathering chains 44 are driven in the directions indicated by direction arrows 54. Support structures 56 provide the base for all the components. Stalk holding attachment 52 is attached to the underside of the drive assemblies 20. The two gathering chains 44 are driven hydraulically in synchronization with the miles-per-hour that the self-propelled machine 36 travels. Call out area 58 is shown in greater detail in FIG. 8C.

Referring now to FIG. 8C, the gathering chains 44 pinch the stalk 60 of the hemp plant 38 to keep the drive assemblies 20 from uprooting the hemp plant 38 during harvesting. The two gathering chains 44 are kept in synchronized relationship to each other to provide a uniform space between them in which to pinch the stalk 60.

Figure 9:
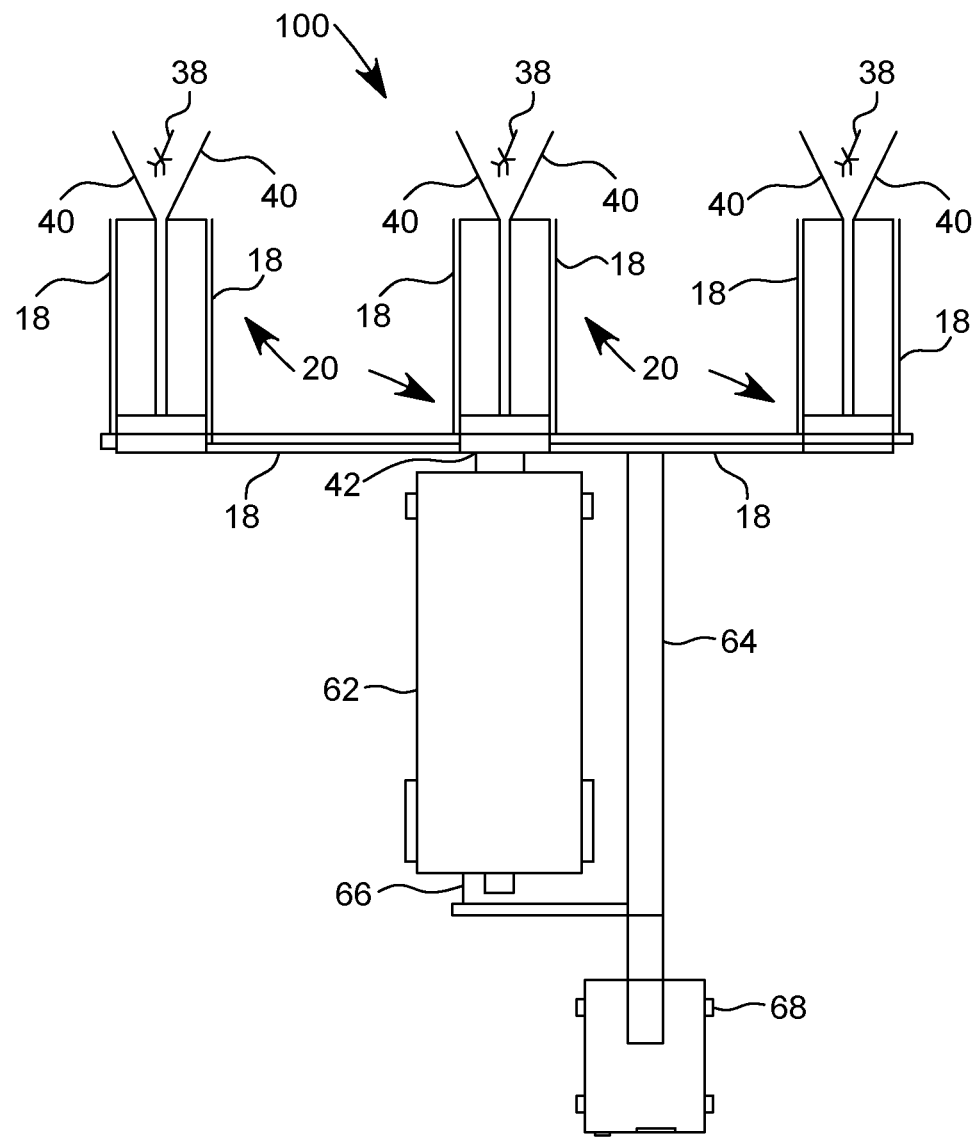
FIG. 9 shows a plan view of a tractor-driven embodiment of the automated hemp field harvester.

FIG. 9 shows a plan view of a tractor-driven embodiment of the automated hemp field harvester. Referring now to FIG. 9, a tractor 62 is used to propel automated hemp field harvester 100 down the rows of hemp plants 38. In this embodiment, automated hemp field harvester 100 has three drive assemblies 20. Front attachment device 42 secures automated hemp field harvester 100 to the tractor 62. The final product discharge conveyor 64 is attached by rear attachment device 66, such as a 3-point lift or other suitable mechanism, in the rear of the tractor 62. By using the rear attachment device 66 the final product discharge conveyor 64 can be raised or lowered to accommodate various types of product transports 68, which could be a wagon or trailer pulled by another vehicle, or a truck with a cargo bed. The final product discharge conveyor 64 is of variable speed and hydraulically driven to accommodate the miles-per-hour of the tractor 62. The final product discharge conveyor 64 is made in variable lengths and widths to accommodate tractor sizes and different types of product transports 68. The final product discharge conveyor 64 can be mounted on left side as well as the right side of tractor 62 to accommodate different tractor types.

Figure 10:
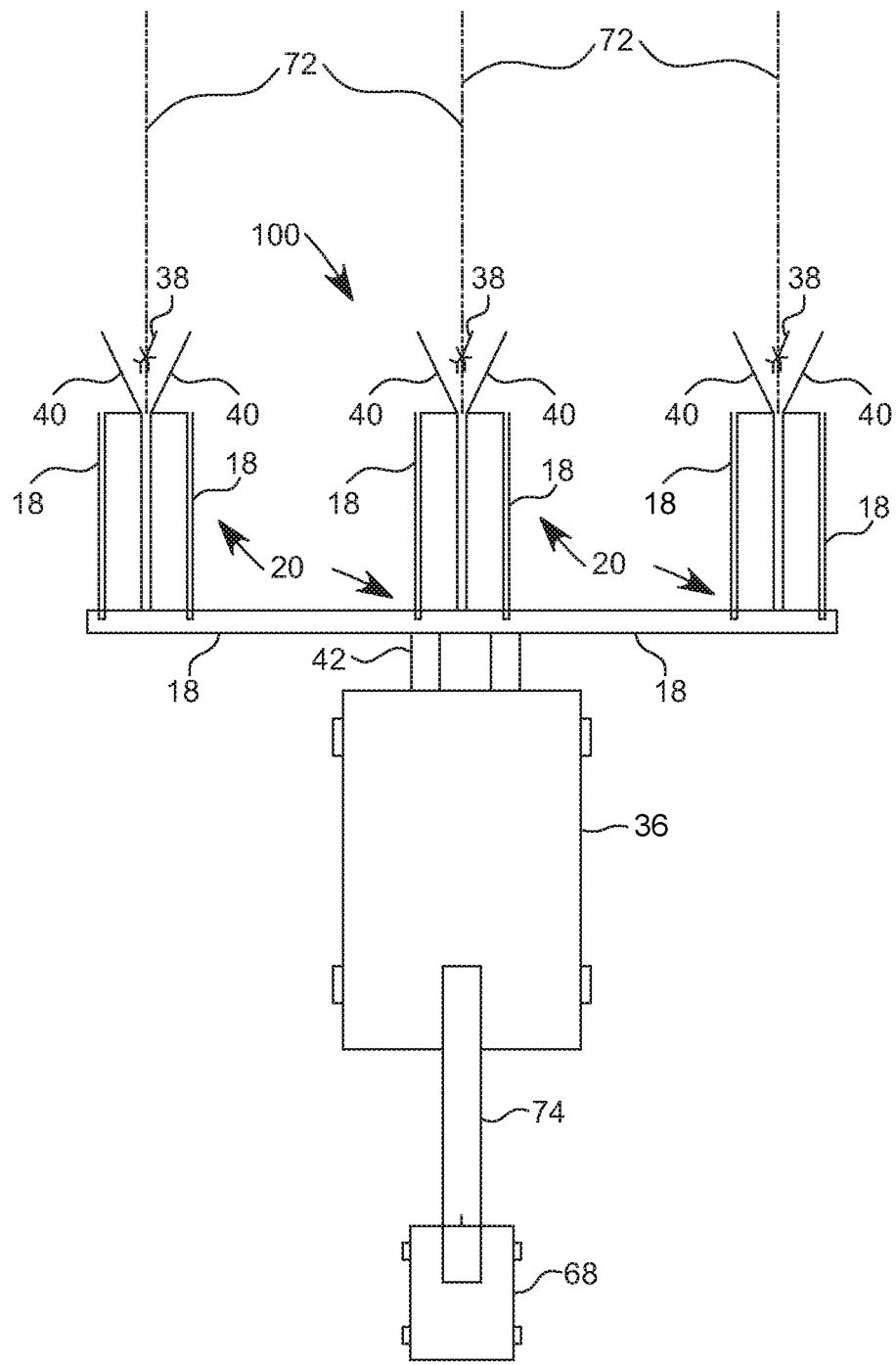
FIG. 10 shows a plan view of a self-propelled harvester embodiment of the automated hemp field harvester.

FIG. 10 shows a plan view of a self-propelled harvester embodiment of the automated hemp field harvester. Referring now to FIG. 10, a self-propelled machine 36 is used to propel automated hemp field harvester 100 down the rows of hemp plants 72. In this embodiment, automated hemp field harvester 100 has three drive assemblies 20. Front attachment device 42, such as a 3-point lift or other suitable mechanism, secures automated hemp field harvester 100 to the self-propelled machine 36. Automated hemp field harvester 100 is quickly attachable to numerous types of self-propelled machine 36. The automated hemp field harvester 100 for self-propelled machines 36 is designed to fit on self-propelled machines 36 with product conveyor systems 74 already built in place, such as a Sweet Corn Harvester. Another example is a Pixall™ Harvester. The product conveyor systems 74 can be raised or lowered to accommodate various types of product transports 68, which could be a wagon or trailer pulled by another vehicle, or a truck with a cargo bed. The product conveyor systems 74 is of variable speed and hydraulically driven to accommodate the miles-per-hour of the self-propelled machine 36. The product conveyor system 74 is made in variable lengths and widths to accommodate tractor sizes and different types of product transports 68.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. An automated hemp field harvester comprising:
   at least one drive assembly oriented in an upward direction with respect to the ground, the at least one drive assembly further comprising;
   at least one structural frame member;
   at least one drive drum pulley attached to a top end of the at least one structural frame member;
   at least one crowned wing pulley attached to a bottom end of the at least one structural frame member;
   at least one combing belt tensioned between the at least one drive drum pulley and the at least one crowned wing pulley, the at least one structural frame member encircled by the at least one combing belt;
   a plurality of comb assemblies attached at an incline to the at least one combing belt;
   at least one deflecting plate proximate to the top end of the at least one structural frame member; and a pair of gathering wings mounted in front of the at least one drive assembly for funneling a plurality of hemp plants into the at least one drive assembly.

2. The automated hemp field harvester according to claim 1 wherein each of the plurality of comb assemblies further comprises:
a comb having a plurality of teeth and a plurality of recesses.

3. The automated hemp field harvester according to claim 2 further comprising:
a mounting belt for each comb assembly, the mounting belt further comprising:
a first side secured to the combing belt; and
a second side secured to the comb;
wherein the first side and the second side are oriented at an acute angle to each other.

4. The automated hemp field harvester according to claim 1 further comprising:
a plurality of belt stabilizers attached to the at least one structural frame member;
a plurality of cleaning brushes located at a top end of the at least one drive assembly; and
a plurality of product discharge conveyor belts that convey a plurality of buds and flowers stripped from the hemp plants by the at least one drive assembly.

5. The automated hemp field harvester according to claim 1 further comprising:
an attachment further comprising:
at least one support structure;
at least one first drive sprocket attached to a front end of the at least one support structure;
at least one second drive sprocket attached to a back end of the at least one support structure;
at least one gathering chain tensioned between the at least one first drive sprocket and the at least one second drive sprocket, the at least one gathering chain further comprising:
an inner chain; and
an outer serpentine belt, the at least one gathering chain pinches a stalk of the plurality of hemp plants to prevent the at least one drive assembly from uprooting the plurality of hemp plants.

6. The automated hemp field harvester according to claim 1 further comprising:
a self-propelled machine to which the at least one drive assembly is attached via a front attachment device to a front of the self-propelled machine;
a product conveyor system built in place in the self-propelled machine; and
a product transport that receives via the product conveyor system a plurality of buds and flowers stripped from the hemp plants.

7. The automated hemp field harvester according to claim 1 further comprising:
a tractor to which the at least one drive assembly is attached via a front attachment device to a front of the tractor;
a final product discharge conveyor attached to the rear of the tractor via a rear attachment device; and
a product transport to receive via the final product discharge conveyor a plurality of buds and flowers stripped from the hemp plants.

8. An apparatus comprising:
a self-propelled machine;
an automated hemp field harvester;
a front attachment device for attaching the automated hemp field harvester to the front of the self-propelled machine, the automated hemp field harvester further comprising:
at least one drive assembly oriented in an upward direction with respect to the ground;
at least one structural frame member;
at least one combing belt attached to the at least one structural frame member, the at least one structural frame member encircled by the at least one combing belt; and
a plurality of comb assemblies attached at an incline to the at least one combing belt;
at least one deflecting plate proximate to the top end of the at least one structural frame member; and
a pair of gathering wings mounted in front of the at least one drive assembly for funneling a plurality of hemp plants into the at least one drive assembly.

9. The apparatus according to claim 8 wherein the automated hemp field harvester further comprises:
at least one drive drum pulley attached to a top end of the at least one structural frame member; and
at least one crowned wing pulley attached to a bottom end of the at least one structural frame member;
wherein the at least one combing belt is tensioned between the at least one drive drum pulley and the at least one crowned wing pulley.

10. The apparatus according to claim 8 wherein each of the plurality of comb assemblies further comprises:
a comb having a plurality of teeth and a plurality of recesses.

11. The apparatus according to claim 10 further comprising:
a mounting belt for each comb assembly, the mounting belt further comprising:
a first side secured to the combing belt; and
a second side secured to the comb;
wherein the first side and the second side are oriented at an acute angle to each other.

12. The apparatus according to claim 8 wherein the automated hemp field harvester further comprises:
a plurality of belt stabilizers attached to the at least one structural frame member;
a plurality of cleaning brushes located at a top end of the at least one drive assembly; and
a plurality of product discharge conveyor belts that convey a plurality of buds and flowers stripped from the hemp plants by the at least one drive assembly.

13. The apparatus according to claim 8 further comprising:
a stalk holding attachment secured under the at least one drive assembly, the stalk holding attachment further comprising:
at least one support structure;
at least one first drive sprocket attached to a front end of the at least one support structure;
at least one second drive sprocket attached to a back end of the at least one support structure;
at least one gathering chain tensioned between the at least one first drive sprocket and the at least one second drive sprocket, the at least one gathering chain further comprising:
an inner chain; and
an outer serpentine belt, the at least one gathering chain pinches a stalk of the plurality of hemp plants to prevent the at least one drive assembly from uprooting the plurality of hemp plants.

14. The apparatus according to claim 8 further comprising:
- a product conveyor system built in place in the self-propelled machine; and
- a product transport that receives via the product conveyor system a plurality of buds and flowers stripped from the hemp plants.

15. An apparatus comprising:
- a tractor;
- an automated hemp field harvester;
- a front attachment device for attaching the automated hemp field harvester to the front of the tractor, the automated hemp field harvester further comprising:
  - at least one drive assembly oriented in an upward direction with respect to the ground;
  - at least one structural frame member;
  - at least one combing belt attached to the at least one structural frame member, the at least one structural frame member encircled by the at least one combing belt; and
  - a plurality of comb assemblies attached at an incline to the at least one combing belt;
- at least one deflecting plate proximate to the top end of the at least one structural frame member; and
- a pair of gathering wings mounted in front of the at least one drive assembly for funneling a plurality of hemp plants into the at least one drive assembly.

16. The apparatus according to claim 15 wherein the automated hemp field harvester further comprises:
- at least one drive drum pulley attached to a top end of the at least one structural frame member; and
- at least one crowned wing pulley attached to a bottom end of the at least one structural frame member;
- wherein the at least one combing belt is tensioned between the at least one drive drum pulley and the at least one crowned wing pulley.

17. The apparatus according to claim 15 wherein each of the plurality of comb assemblies further comprises:
- a comb having a plurality of teeth and a plurality of recesses.

18. The apparatus according to claim 17 further comprising:
- a mounting belt for each comb assembly, the mounting belt further comprising:
  - a first side secured to the combing belt; and
  - a second side secured to the comb;
- wherein the first side and the second side are oriented at an acute angle to each other.

19. The apparatus according to claim 15 wherein the automated hemp field harvester further comprises:
- a plurality of belt stabilizers attached to the at least one structural frame member;
- a plurality of cleaning brushes located at a top end of the at least one drive assembly; and
- a plurality of product discharge conveyor belts that convey a plurality of buds and flowers stripped from the hemp plants by the at least one drive assembly.

20. The apparatus according to claim 15 further comprising:
- at least one support structure;
- at least one first drive sprocket attached to a front end of the at least one support structure;
- at least one second drive sprocket attached to a back end of the at least one support structure;
- at least one gathering chain tensioned between the at least one first drive sprocket and the at least one second drive sprocket, the at least one gathering chain further comprising:
  - an inner chain; and
  - an outer serpentine belt, the at least one gathering chain pinches a stalk of the plurality of hemp plants to prevent the at least one drive assembly from uprooting the plurality of hemp plants.

21. The apparatus according to claim 15 further comprising:
- a final product discharge conveyor attached to the rear of the tractor via a rear attachment device; and
- a product transport that receives via a product conveyor system a plurality of buds and flowers stripped from the hemp plants.

* * * * *